(12) United States Patent
Ranft et al.

(10) Patent No.: US 10,532,643 B2
(45) Date of Patent: Jan. 14, 2020

(54) VEHICLE COMPONENT

(71) Applicant: Dr. Ing. h.c. F. Porsche Aktiengesellschaft, Stuttgart (DE)

(72) Inventors: Detlev Ranft, Ettlingen (DE); Kai Geissenhöner, Suhl (DE)

(73) Assignee: Dr. Ing. h.c.F. Porsche Aktiengesellschaft (DE)

(*) Notice: Subject to any disclaimer, the term of this patent is extended or adjusted under 35 U.S.C. 154(b) by 20 days.

(21) Appl. No.: 15/950,417

(22) Filed: Apr. 11, 2018

(65) Prior Publication Data
US 2018/0326829 A1 Nov. 15, 2018

(30) Foreign Application Priority Data
May 9, 2017 (DE) .......................... 10 2017 109 950

(51) Int. Cl.
| | |
|---|---|
| *B60J 7/22* | (2006.01) |
| *B60N 2/853* | (2018.01) |
| *B60N 2/859* | (2018.01) |
| *B60N 2/856* | (2018.01) |
| *B62D 35/00* | (2006.01) |
| *B60N 2/00* | (2006.01) |
| *B60J 1/18* | (2006.01) |

(52) U.S. Cl.
CPC ............. *B60J 7/223* (2013.01); *B60J 1/1823* (2013.01); *B60N 2/002* (2013.01); *B60N 2/853* (2018.02); *B60N 2/856* (2018.02); *B60N 2/859* (2018.02); *B62D 35/007* (2013.01)

(58) Field of Classification Search
CPC ... B60J 7/223; B60J 1/1823; B60J 1/20; B60J 9/04; B62D 35/00; B62D 35/007; B60N 2/853; B60N 2/856; B60N 2/859
See application file for complete search history.

(56) References Cited

U.S. PATENT DOCUMENTS

| | | | |
|---|---|---|---|
| 6,926,062 B2* | 8/2005 | Neumann | B60J 1/2091 160/370.21 |
| 7,399,025 B2* | 7/2008 | Hermann | B60J 7/223 296/180.1 |
| 7,559,600 B2* | 7/2009 | Neubrand | B60J 7/223 296/180.1 |
| 7,699,381 B2* | 4/2010 | Goetz | B60J 7/223 296/180.1 |
| 8,602,484 B2* | 12/2013 | Geissenhoner | B60J 7/223 296/107.08 |
| 9,987,909 B2* | 6/2018 | Kopp | B60J 7/202 |
| 2007/0040413 A1* | 2/2007 | Rimmelspacher | B60J 7/223 296/180.5 |

(Continued)

*Primary Examiner* — Gregory A Blankenship
(74) *Attorney, Agent, or Firm* — RatnerPrestia

(57) ABSTRACT

A vehicle component for a motor vehicle having a rear seat device with at least one headrest and having a wind deflector device with an extendable planar element for protecting front seats of the motor vehicle against relative wind. In an extended state, the planar element extends from a region behind the headrest to a region in front of the headrest. In this context, the headrest can be pivoted by a pivoting device from a position of use, in which the headrest projects beyond a height of the planar element in the extended state, into a position of rest. In the position of rest, the headrest is arranged under the extended planar element.

10 Claims, 3 Drawing Sheets

(56) References Cited

U.S. PATENT DOCUMENTS

| | | | |
|---|---|---|---|
| 2008/0067834 A1* | 3/2008 | Erb | B60J 7/19 |
| | | | 296/180.1 |
| 2011/0018307 A1* | 1/2011 | Rimmelspacher | B60J 7/223 |
| | | | 296/180.5 |
| 2011/0175402 A1* | 7/2011 | Schulz | B60J 7/203 |
| | | | 296/217 |
| 2012/0193949 A1* | 8/2012 | Bernhard | B60J 7/223 |
| | | | 297/184.1 |
| 2014/0015288 A1* | 1/2014 | Tachikawa | B60N 2/3013 |
| | | | 297/61 |
| 2015/0001899 A1* | 1/2015 | Line | B60R 7/043 |
| | | | 297/188.04 |
| 2017/0174063 A1* | 6/2017 | Seidl | B60J 7/223 |
| 2017/0182916 A1* | 6/2017 | Yamane | B60N 2/856 |
| 2017/0259715 A1* | 9/2017 | Heo | B60N 2/80 |
| 2018/0126819 A1* | 5/2018 | Bast | B60J 7/223 |
| 2018/0326829 A1* | 11/2018 | Ranft | B60N 2/859 |
| 2019/0152370 A1* | 5/2019 | Palmieri | B60N 2/894 |

* cited by examiner

VEHICLE COMPONENT

CROSS-REFERENCE TO RELATED APPLICATION

This application claims priority to German Patent Application No. DE 10 2017 109 950.6, filed May 9, 2017, the contents of such application being incorporated by reference herein in their entirety.

FIELD OF THE INVENTION

The present invention relates to a vehicle component for a motor vehicle having at least one rear seat device with at least one headrest and having at least one wind deflector device with at least one extendable planar element.

BACKGROUND OF THE INVENTION

A headrest in a motor vehicle permits improved protection of the vehicle occupants in the event of accidents. In order to be able to provide particularly good protection, it is advantageous also to equip the rear seats in convertible or sports cars with fully extensive or full headrests.

However, the requirement with respect to the height of such headrests leads to problems in certain vehicles and, for example, in convertibles with a wind deflector. In order to ensure particularly good wind protection for the front seats, an extended wind protection material must run underneath the height of these headrests. Therefore, integrating fully extensive headrests on the rear seat installation involves considerable structural outlay in such vehicles. It is often necessary to redevelop the wind protection, which entails considerable costs.

SUMMARY OF THE INVENTION

The vehicle component described herein permits the use of headrests on the rear seats and at the same time provide an effective wind protection which can be implemented economically.

The vehicle component according to aspects of the invention is provided for a motor vehicle and preferably for a convertible motor vehicle. The vehicle component comprises at least one rear seat device with at least one headrest. The vehicle component comprises at least one wind deflector device with at least one extendable planar element, in particular for protecting front seats of the motor vehicle against relative wind. The planar element extends in an extended state from a region behind the headrest to a region in front of the headrest. In this context, the headrest can be pivoted by means of at least one pivoting device from a position of use, in which the headrest projects beyond a height of the planar element in the extended state, into a position of rest. In the position of rest, the headrest is arranged under the extended planar element.

The vehicle component according to aspects of the invention provides many advantages. A considerable advantage is that wind deflector devices which are present can continue to be used even if the rear seat device is equipped with a correspondingly high or fully extensive headrest. As a result, headrests can be used which provide a high level of safety and as a result project into a movement space of the planar element. Despite the use of these particularly safe headrests it is therefore possible to dispense with redevelopment or costly structural modification of existing wind protection devices.

In addition, pivoting of the headrest provides a particularly reliable movement which can be implemented with very economic structural outlay, in order to remove the headrest from the movement space of the planar element. The pivoting device can be integrated, for example, into already existing or proven seats without complicated mechanisms having to be inserted into the backrest or the headrest. A pivoting device also provides many structural advantages and, for example, particularly fault-resistant operation, even over a reliably long period of time of a motor vehicle. This is of great advantage particularly in the case of motor vehicles in the premium range or sporty range.

The headrest can preferably be pivoted forward. This provides the advantage that a high degree of safety is obtained. This is because in this way unintentional pivoting rearward, e.g. in the case of an accident, can be very reliably prevented. A further advantage of the pivoting forward is that the headrest is not unintentionally left in the position of rest if someone sits down on the rear seat. This is because the optimum protective effect cannot be ensured then, as is also the case when a headrest is not set at the correct height. In addition, the installation space behind the rear seat device is not required for the pivoting or taken up by it. For example the wind deflector device can be arranged in said space. However, it is also possible for the headrest to be pivotable to the rear.

To the front and to the rear and other corresponding indications within the scope of the present invention preferably relate to the forward direction of travel of the motor vehicle and the operational orientation of the motor vehicle.

The pivoting device and the wind deflector device are preferably operatively connected via at least one control device. The control device is in particular suitable for at least partially monitoring, and is designed to at least partially monitor, the pivoting of the headrest by means of at least one sensor device, and is suitable for preventing, and is designed to prevent, the planar element from being extended if the headrest is arranged outside the position of rest. As a result, a collision of the planar element with the headrest can be effectively prevented. It is also possible for the control device to be suitable for preventing pivoting of the headrest into the position of use when the planar element is extended, and to be designed to do so.

The wind deflector device comprises, in particular, at least one activation device for extending the planar element in an at least partially automated fashion. The activation device is preferably operatively connected to the control device. The control device can also be suitable for monitoring, and can be designed to monitor, occupation of the rear seat device, and when occupation is detected said control device is suitable for preventing, and is designed to prevent, the planar element from being extended and/or the headrest from being pivoted.

In one advantageous refinement, the headrest can be pivoted at least partially manually into the position of use. A passenger can therefore easily pivot the headrest into the position of use if he would like to sit on the rear seat. It is therefore possible to dispense with a drive device for pivoting into the position of use. In particular after the pivoting the headrest is latched into the position of use in order to block unintentional pivoting back and/or in order to signal that the position of use has been reached.

However, it is also possible for the headrest to be pivoted at least in a partially automated fashion into the position of use. In particular, the pivoting device then comprises at least one drive device. It is possible for the headrest to be pivoted into the position of rest at least partially manually and/or in an at least partially automated fashion.

The pivoting device particularly preferably comprises at least one pretensioning device. The pretensioning device can be loaded, in particular, by pivoting the headrest into the position of use. The headrest can preferably be moved into the position of rest in an at least partially automated fashion by relieving the pretensioning device of loading. Such a refinement is not costly in structural terms and nevertheless provides very convenient pivoting of the headrest into the position of rest.

An inverted arrangement in which the pretensioning device can be loaded into the position of rest, in particular, by pivoting the headrest is also possible. The headrest can then be moved into the position of use in an least partially automated fashion by relieving the pretensioning device of loading. The pretensioning device comprises, in particular, at least one loadable force accumulator and, for example, at least one spring.

The pivoting device is preferably suitable, in particular by means of at least one control device, for triggering the relieving of the pretensioning device of loading in an automated fashion, and is designed to do so. In particular, the control device is suitable for relieving the pretensioning device of loading, and is designed to do so, when the wind deflector device is activated and, preferably, when the planar element is extended. The control device can also be suitable for triggering, and be designed to trigger, unloading of the pretensioning device when a convertible roof is opened.

Such a refinement has the advantage that, for example, the driver does not have to worry about the pivoting of the headrest when he extends the wind deflector or opens a convertible roof. In particular, the control device is suitable for monitoring, and is designed to monitor, occupation of the rear seat device, and is suitable for preventing, and is designed to prevent, relieving of the pretensioning device of loading when occupation is detected. It is also possible for the relieving of the pretensioning device of loading to be triggered manually. For example, for this purpose at least one operator control element which can be activated manually or the like is provided.

In particular, the headrest can be pivoted between the position of rest and the position of use through an angle from 70° to 110°. The headrest can preferably be pivoted through essentially 90°, in particular 90°. By means of such an angle it is possible to reliably ensure that the headrest is pivoted out of the extension region of the planar element. The headrest can also be pivoted through more than 110° and/or less than 70°. In particular, the headrest can be pivoted through a permanently predefined angle. The headrest can also be pivoted through a variable, and for example settable, angle.

In particular, the headrest can be pivoted by means of at least one rotational shaft. The rear seat device preferably comprises at least one rear seat backrest. The headrest is preferably pivotably mounted on the rear seat backrest by means of at least one rotational shaft. In particular, the rotational shaft is arranged at the level of a lower section and preferably a lower half and particularly preferably a lower quarter of the headrest. Such an arrangement permits a corresponding degree of lowering. The rotational shaft can also be arranged on at least one other component of the rear seat device. Two or more rotational shafts can also be provided.

In one advantageous refinement, the pivoting device comprises at least one brake device for braking the pivoting movement in at least one direction. As a result, the movement process can be optimized and, for example, configured in a particularly user-friendly fashion. This is advantageous in particular in conjunction with a pretensioning device, since in this way an excessively rapid pivoting or even tipping is reliably avoided. The brake device comprises, in particular, at least one silicone brake. A different suitable friction material and, for example, a different plastic can also be provided. A different suitable brake device is also possible.

The brake device is connected, in particular, to the rotational shaft. The rotational shaft can be integrated in the brake device. It is possible for the entire pivoting movement to be capable of being braked. It is also possible that just one part of the pivoting movement and, for example, at least one specific pivoting angle range can be braked. The pivoting movement can be capable of being at least partially braked, in the direction of the position of rest and/or in the direction of the position of use.

The planar element in an extended state preferably has at least one essentially upright, in particular upright, first planar section. The planar element comprises, in particular, at least one second planar section which is arranged transversely with respect to the first planar section. The second planar section preferably runs at least partially above the headrest, in particular when the headrest is pivoted into the position of rest.

A planar element which is configured it such a way provides a particularly effective protection against the relative wind. With a planar element which is configured in such a way it is particularly decisive that said element runs directly behind the front seats and underneath the headrests in order to provide optimum wind protection. It is therefore particularly significant that the low arrangement, necessary for optimum wind protection, of the second planar section does not collide with the correspondingly high headrest. The pivotability of the headrests according to aspects of the invention is therefore particularly advantageous with such a configuration of the wind deflector device and/or of the planar element.

In particular, the first planar section extends at least partially in front of a rear seat backrest. Particularly effective wind protection can be achieved there. In particular, the planar element is connected by one end behind the rear seat device. The planar element is, for example, connected to a vehicle bodywork structure and/or some other suitable supporting structure. In particular, the planar element is connected indirectly via a roller blind element. The planar element is preferably connected at another end to a clamping bracket. In particular, the clamping bracket can be pivoted from a region behind the rear seat device into a region in front of the headrest in order to extend the planar element. In the extended state, the damping bracket is preferably arranged upright.

In particular, the planar element is divided between its ends into the first and second planar sections by at least one deflection bracket. In particular, the deflection bracket can be pivoted forward, from a region behind the rear seat device, into a region in front of the headrest. In particular, the planar element is connected by one end of the second planar section behind the rear seat device. In particular, the planar element is connected by one end of the first planar section to the clamping bracket.

The planar element is, in particular, of flexible design. In particular, the planar element is embodied as a roller blind material. The planar element is preferably embodied as a mesh-like wind protection material or comprises at least one such material. In a non-extended state the planar element is, in particular, rolled onto a roller blind element. The roller blind element is arranged, in particular, behind the rear seat device.

The motor vehicle according to aspects of the invention is, in particular, a convertible motor vehicle and is equipped with at least one vehicle component such as has been described above.

The motor vehicle according to aspects of the invention provides, by virtue the headrests, a high degree of safety at the rear seats and at the same time permits particularly effective wind protection for the front seats.

The motor vehicle comprises, in particular, at least one front seat device. In particular, the planar element can be extended behind the front seat device. In particular, in the extended state the planar element makes available an essentially closed and, in particular, mesh-like wind protection surface behind the front seat device. The wind protection surface runs, in particular, to behind the rear seat device. The wind protection surface extends, in particular, over and beyond the rear seat device.

The front seat device comprises, in particular, at least one driver's seat and at least one front seat passenger's seat. The front seat device can also be embodied as a seat bench.

The rear seat device comprises, in particular, at least one rear seat bench. The rear seat device can also comprise at least one rear seat, and preferably at least two separate rear seats. The rear seat device comprises, in particular, at least two pivotable headrests. Three pivotable headrests are also possible. It is also possible to provide two pivotable headrests and one auxiliary headrest which has a lower structural height and which, in particular, cannot be pivoted or else can be pivoted.

The headrest is, in particular, embodied as a fully extensive headrest. In particular, extension of the planar element is not adversely affected by the headrest in the position of rest. In particular, in the position of rest, the headrest does not make contact with the extended planar element. In particular, in the position of use, the headrest projects into an extension region of the planar element. In particular, correct extension of the planar element is not possible and not provided if the headrest is arranged in the position of use.

BRIEF DESCRIPTION OF THE DRAWINGS

Further advantages and features of the present invention arise from the exemplary embodiment which is explained below with reference to the appended figure. In the figures.

DETAILED DESCRIPTION OF THE INVENTION

Figure 1:
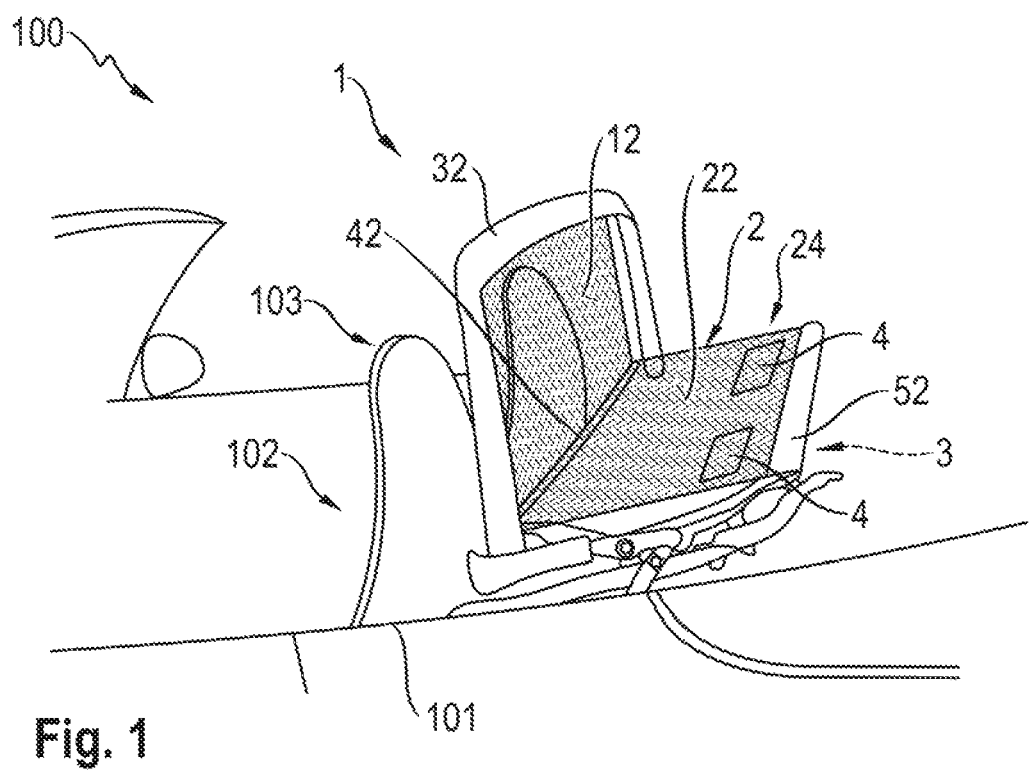
FIG. 1 shows a highly schematic illustration of a vehicle component according to aspects of the invention in a motor vehicle.

FIG. 1 shows a vehicle component 100 according to aspects of the invention in a motor vehicle 101 which is embodied here as a convertible motor vehicle. The vehicle component 100 comprises a wind deflector device 1 which protects the front seats 102 of the motor vehicle 101 against relative wind. The front seats 102 are made available here by a front seat device 103 with a driver's seat and a front seat passenger's seat.

The wind deflector device 1 is equipped with an extendable planar element 2, which is shown here in an extended state. The planar element 2 is composed of a mesh-like wind protection material here.

In the extended state, the planar element 2 forms an upright first planar section 12 and a second planar section 22 which runs transversely or horizontally with respect to the first planar section 12. For this purpose, the planar element 2 is attached by one end to a damping bracket 32. Another end of the planar element 2 is attached to a roller blind element 52, onto which it can be wound when not in use.

A deflection bracket 42 serves here to deflect the planar element 2 in such a way that it is extended into the upright first planar section 12 and the horizontal second planar section 22.

The vehicle component 100 according to aspects of the invention also has a rear seat device 3 with two headrests 4. For the sake of better clarity of illustration, only the two headrests 4 of the rear seat device 3 are shown here in a highly schematic fashion. The rear seat device is embodied here as a seat bench with two or three seats and comprises a common rear seat backrest 13. The headrests 4 are pivotably connected to the rear seat backrest 13.

In order to provide particularly good protection for the vehicle occupants, the headrests 4 are embodied here as fully extensive headrests 4. Owing to the particular requirement of safety, the headrests 4 have a specific height. An optimum protection and optimum support of the head can therefore be ensured.

Owing to their height, the headrests therefore protrude beyond the surface of the horizontally extended second planar section 22 when they are arranged in a position of use 14 (not shown here). The position of use 14 is here the position of the headrests 4 in which persons can sit on a sitting surface of the rear seat device 3 and in which the headrests 4 provide the envisaged protection.

In order to avoid collision between the headrests 4 and the planar element 2, they are pivoted here into a position of rest 24. As a result of the pivoting, the height of the headrests 4 is reduced in such a way that the headrests 4 are arranged underneath the horizontally running second planar section 22. In this way, the rear seat device 3 is equipped with particularly secure headrests 4 and at the same time the advantageous wind deflector device 1 is used.

As a result of the pivoting of the headrests 4, it is possible without difficulty that in the position of use 14 said headrests 4 protrude beyond the horizontally running second planar section 22. Therefore, despite the height of the headrests 4, a very largely closed mesh surface is obtained behind the front seats 102 or behind the front seats 103 with both vertical and horizontal tensioning. This makes the wind deflector device 1 particularly effective.

Figure 2:
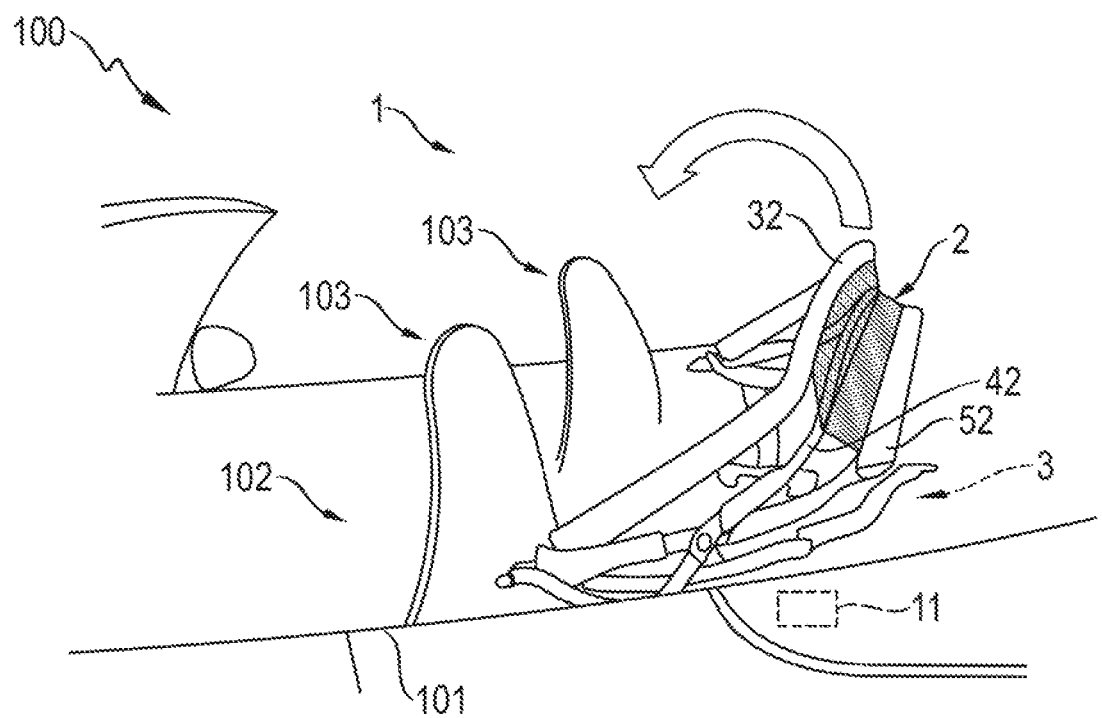
FIG. 2 shows a further highly schematic illustration of the vehicle component.

FIG. 2 shows the wind deflector device 1 in FIG. 1 with a planar element 2 which has not yet been completely extended. In order to extend the planar element 2, the clamping bracket 32 is pivoted forward in the direction of the front seat device 103 until it is located in the upright position shown in FIG. 1. In this context, the clamping bracket 32 does not entrain the planar element 2 with it and unwinds it from the roller blind element 52. The pivoting movement of the clamping bracket 32 is indicated here by an arrow.

In order to extend the planar element 2 into the first and second planar sections 12, 22, the deflection bracket 42 is also pivoted forward. Before the tensioning of the planar element 2, or when the tensioning bracket 32 is not in use, the deflection bracket 42 and the planar element 2 are arranged behind the rear seat device 3 or the headrests 4. In the tensioned state, the planar element 2 then runs from a region behind the headrest 4 to just behind the front seat device 103, as shown in FIG. 1.

In order to extend the planar element 2, e.g. an activation device 11 is provided, with the result that automated extension is possible.

Figure 3:
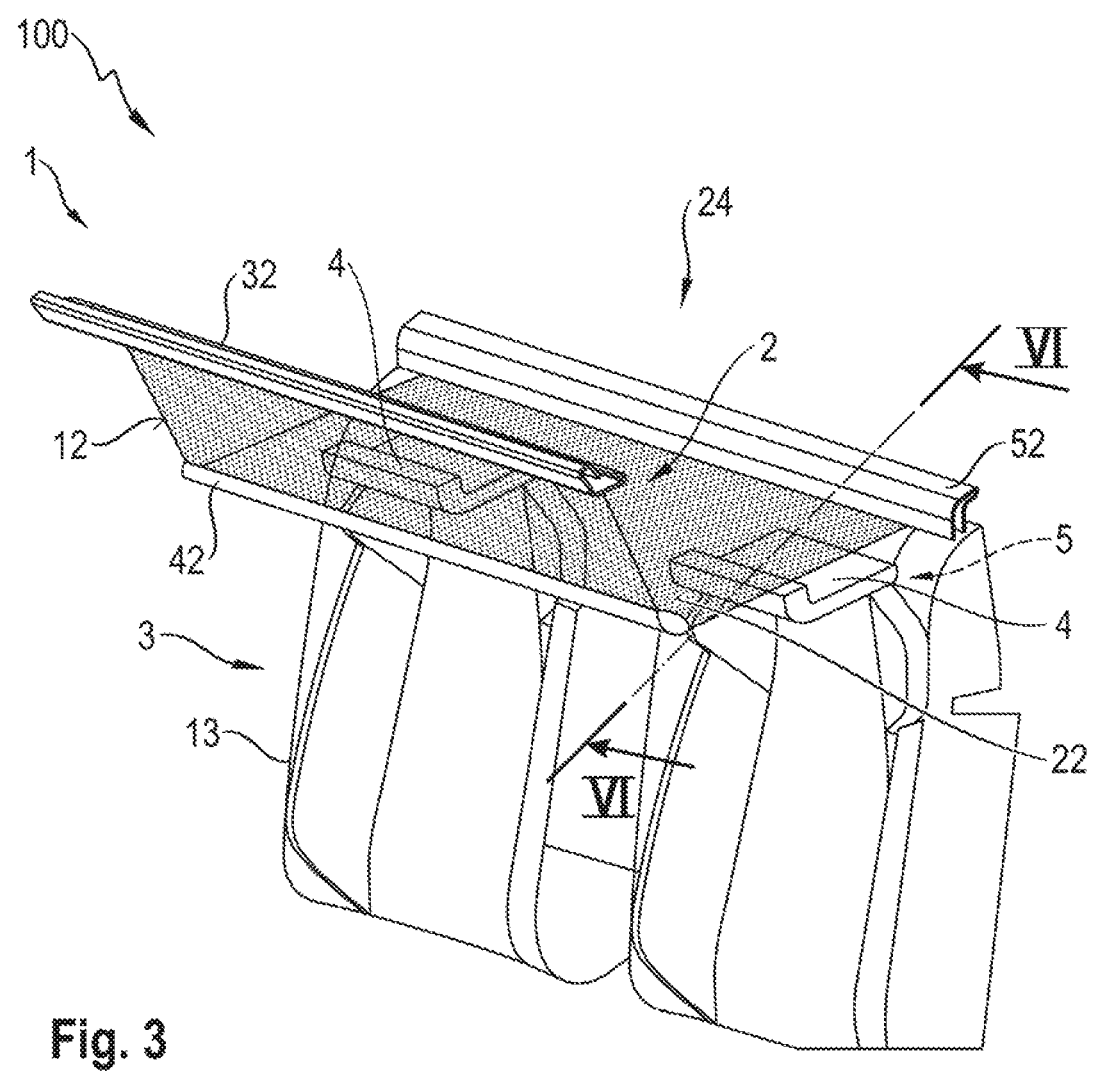
FIG. 3 shows a vehicle component according to aspects of the invention with headrests in a position of rest.

FIG. 3 shows an illustration of the vehicle component 100 according to aspects of the invention in which the arrangement of the rear seat device 3 and the wind deflector device 1 can be seen particularly clearly. The headrests 4 can be pivoted by means of a pivoting device 5 (not illustrated in more detail here) and are arranged in the position of rest 24 here. As a result of the partially transparent illustration of the planar element 2, the arrangement of the headrests 4 underneath the planar element 2 can be seen particularly clearly. The headrests 4 are pivoted through approximately 90° with respect to the position of use 14 here.

Figure 4:
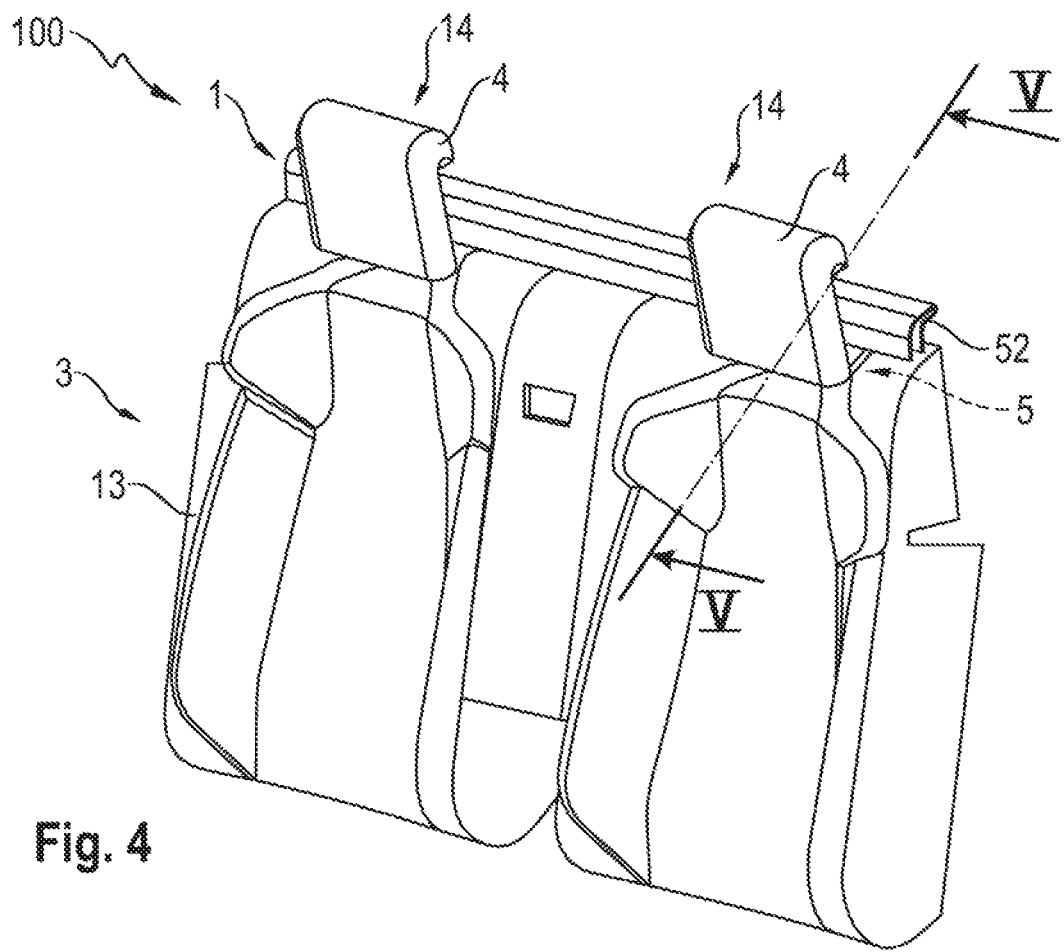
FIG. 4 shows the vehicle component with headrests in a position of use.

FIG. 4 shows the vehicle component 100 with a retracted planar element 2. The headrests 4 of the rear seat device are pivoted into a position of use 14. It can be particularly clearly seen here that the height of the headrests 4 would project beyond the second planar section 22 if the planar element 2 were extended. In this position, vehicle occupants can sit on the rear seat device 3, in which case the headrests 4 provide them with particular protection.

Figure 5:
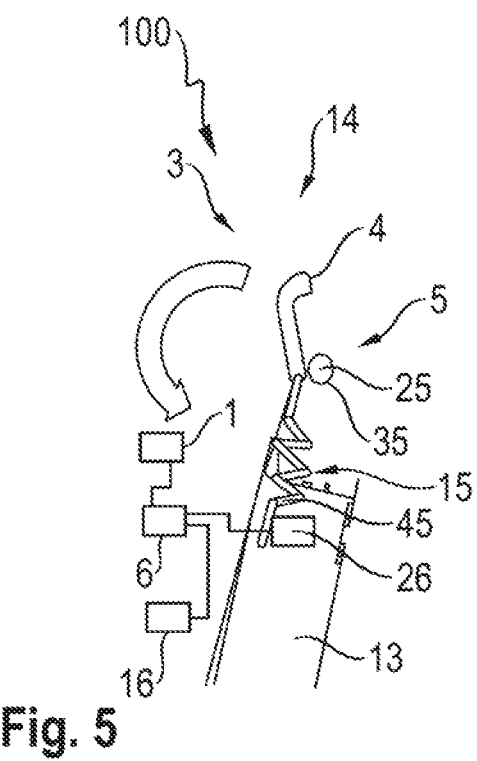
FIG. 5 shows a view of a detail of the vehicle component in a sectional illustration with a headrest in a position of use.
Figure 6:
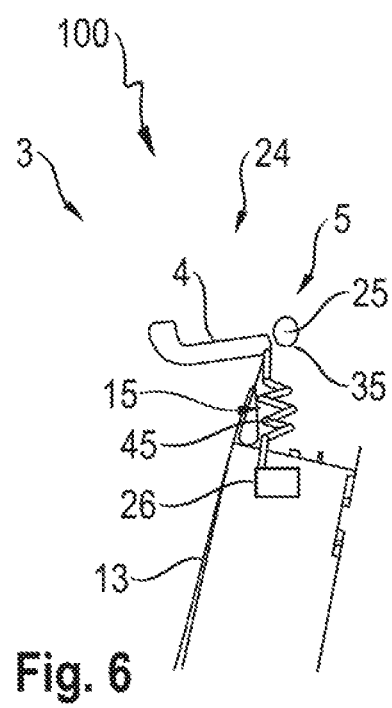
FIG. 6 shows the vehicle component in FIG. 5 with a headrest in a position rest.

FIGS. 5 and 6 illustrate the vehicle component 100 in more detail in an exemplary configuration. FIG. 5 shows here the headrest 4 in a position of use 14, and FIG. 6 shows the headrest 4 in a position of rest 24.

The pivoting device 5 comprises here a rotational shaft 25, by means of which the headrest 4 is rotatably mounted on the rear seat backrest 13. In this context, the headrest 4 can be moved, by means of an approximately 90° rotational movement, forward underneath the horizontally extended planar section 22 into the position of rest 24 shown in FIG. 6. The pivoting movement is indicated by an arrow here.

The wind deflector device 1 and the pivoting device 5 are connected to one another here by means of a control device 6. The control device 6 is also operatively connected to a sensor device 16, by which the positioning of the headrest 4 can be detected. The sensor device 16 can therefore monitor whether the headrest 4 is arranged in the position of rest 24 or in the position of use 14 or possibly also in an undesired incorrect position.

In this context, the control device 6 prevents activation of the wind deflector device 1 or extension of the planar element 2 if the headrest 4 is not arranged in the position of rest 24. For example, for this purpose the control device 6 correspondingly actuates an activation device 11 which is provided for automatic extension of the planar element 2. The wind deflector movement is therefore enabled only if headrest 4 is not in its movement space.

The pivoting of the headrest 4 into the position of rest 24 takes place here by means of a spring-pretensioned method. For this purpose, the pivoting device 5 comprises here a pretensioning device 15 with at least one spring 45. The pretensioning device 15 is loaded into the position of rest 24 by the pivoting of the headrest 4, and pretensions the spring 45 in the process.

In the position of use 14, the headrest 4 is latched, with the result that undesired pivoting is securely blocked. For this purpose, the pivoting device 54 comprises here a triggering device 26 which locks or latches the loaded pretensioning device 15 and the headrest 4 in the position of use 14.

If the headrest 4 is to be pivoted into the position of rest 24, manual and/or automated and, for example, electrical release of the latching occurs here. For this purpose, the triggering device 26 is correspondingly manually activated or is addressed by the control device 6. The triggering device 26 enables the latching, with the result that the pretensioning device 15 can be relieved of loading, and the headrest 4 can be pivoted from the position of use 14 into the position of rest 24.

For example, the control device 6 actuates the triggering device 26 in such a way that the headrest 4 pivots when the wind deflector device 1 is to be extended or a roof is to be opened. In this context, there can be provision in one refinement that the control device 6 previously enquires whether the rear seat device 3 is occupied, using the sensor device 16. As a result, the headrest 4 can be reliably prevented from pivoting when the rear seats are occupied.

In one refinement, a reversed method of functioning of the pretensioning device 15 can also be provided, with the result that said pretensioning device 15 is loaded into the position of rest 14 when the headrest 4 is pivoted and/or is relieved of loading in the case of pivoting into the position of use 24.

In order to optimize the movement sequence during the pivoting of the headrest 4, in one refinement a brake device 35 is provided. The brake device 35 is embodied, for example, as a silicone brake and is connected to the rotational shaft 25. The brake device 35 can ensure, for example, particularly gentle and uniform pivoting, which is particularly advantageous, in particular, in combination with a pretensioning device 15.

LIST OF REFERENCE NUMBERS

1 Wind deflector device
2 Planar element
3 Rear seat device
4 Headrest
5 Pivoting device
6 Control device
11 Activation device
12 Planar section
13 Rear seat backrest
14 Position of use
15 Pretensioning device
16 Sensor device
22 Planar section
24 Position of rest
25 Rotational shaft
26 Triggering device
32 Clamping bracket
35 Brake device
42 Deflection bracket
45 Spring
52 Roller blind element
100 Vehicle component
101 Motor vehicle
102 Seat
103 Front seat device

What is claimed is:

1. A vehicle component for a motor vehicle having at least one rear seat device with at least one headrest and having at least one wind deflector device with at least one extendable planar element for protecting front seats of the motor vehicle against relative wind,
   wherein the planar element in an extended state extends from a region behind the headrest to a region in front of the headrest,
   wherein the headrest is configured to be pivoted by at least one pivoting device from a position of use, in which the headrest projects beyond a height of the planar element in the extended state, into a position of rest, in which the headrest is arranged under the extended planar element,
   wherein the pivoting device and the wind deflector device are operatively connected via at least one control device, and wherein the control device is configured for at least partially monitoring the pivoting of the headrest by means of at least one sensor device, and the control device is configured for preventing the planar element from being extended if the headrest is arranged outside the position of rest.

2. The vehicle component as claimed in claim 1, wherein the headrest is configured to be pivoted forward.

3. The vehicle component as claimed in claim 1, wherein the headrest is configured to be pivoted at least partially manually into the position of use.

4. The vehicle component as claimed in claim 1, wherein the pivoting device comprises at least one pretensioning device, and wherein the pretensioning device is configured to be loaded by pivoting the headrest into the position of use, and wherein the headrest is configured to be moved into the position of rest in an at least partially automated fashion by relieving the pretensioning device of loading.

5. The vehicle component as claimed in claim 4, wherein the pivoting device is configured, by means of at least one control device, for triggering the relieving of the pretensioning device of loading in an automated fashion.

6. The vehicle component as claimed in claim 1, wherein the headrest is configured to be pivoted between the position of rest and the position of use through an angle from 70 degrees to 110 degrees.

7. The vehicle component as claimed in claim 1, wherein the rear seat device comprises at least one rear seat backrest, and wherein the headrest is pivotably mounted on the rear seat backrest by at least one rotational shaft.

8. The vehicle component as claimed in claim 1, wherein the pivoting device comprises at least one brake device for braking the pivoting movement in at least one direction.

9. The vehicle component as claimed in claim 1, wherein the planar element in an extended state has at least one substantially upright first planar section and at least one second planar section which is arranged transversely with respect to the first planar section, and wherein the second planar section runs at least partially above the headrest when the headrest is pivoted into the position of rest.

10. A convertible motor vehicle having the at least one vehicle component as claimed in claim 1.

* * * * *